United States Patent
Harter

(10) Patent No.: US 11,738,695 B2
(45) Date of Patent: Aug. 29, 2023

(54) EXTERNALLY MOUNTED COMPONENT OF A MOTOR VEHICLE

(71) Applicant: Dr. Ing. h.c. F. Porsche Aktiengesellschaft, Stuttgart (DE)

(72) Inventor: Sebastian Harter, Leonberg (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 182 days.

(21) Appl. No.: 17/191,857

(22) Filed: Mar. 4, 2021

(65) Prior Publication Data

US 2021/0276495 A1  Sep. 9, 2021

(30) Foreign Application Priority Data

Mar. 9, 2020  (DE) .................... 10 2020 106 289.3

(51) Int. Cl.
| | |
|---|---|
| *B60R 11/04* | (2006.01) |
| *H04N 23/54* | (2023.01) |
| *H04N 23/55* | (2023.01) |
| *B60R 11/00* | (2006.01) |
| *G03B 17/56* | (2021.01) |

(52) U.S. Cl.
CPC ............ *B60R 11/04* (2013.01); *H04N 23/54* (2023.01); *H04N 23/55* (2023.01); *B60R 2011/004* (2013.01); *B60R 2011/0059* (2013.01); *G03B 17/561* (2013.01)

(58) Field of Classification Search
CPC ............... B60R 11/04; B60R 2011/004; B60R 2011/0059; G03B 17/561
USPC ...................................................... 248/226.11
See application file for complete search history.

(56) References Cited

U.S. PATENT DOCUMENTS

| | | | | | |
|---|---|---|---|---|---|
| 7,534,021 | B2* | 5/2009 | Naik | ...................... | B60R 19/50 |
| | | | | | 362/546 |
| 9,457,733 | B2* | 10/2016 | Schütz | ................. | H04N 5/2252 |
| 10,625,689 | B2* | 4/2020 | Yang | .................... | G03B 17/561 |
| 11,220,222 | B2* | 1/2022 | Kitagawa | .............. | B60R 19/483 |
| 2013/0235204 | A1* | 9/2013 | Buschmann | ............ | H04N 7/18 |
| | | | | | 348/148 |
| 2014/0301766 | A1 | 10/2014 | Koerner et al. | | |
| 2015/0183366 | A1* | 7/2015 | Da Deppo | .............. | B60R 11/04 |
| | | | | | 348/148 |

(Continued)

FOREIGN PATENT DOCUMENTS

| | | |
|---|---|---|
| CN | 104105369 A | 10/2014 |
| DE | 1942144 U | 7/1966 |

(Continued)

*Primary Examiner* — Nkeisha Smith
(74) *Attorney, Agent, or Firm* — Leydig, Voit & Mayer, Ltd.

(57) ABSTRACT

An externally mounted component of a motor vehicle includes a receiving space configured to receive a camera device or an electronic sensor device, at least one outer opening shaped to enable insertion of a lens of the camera device or an outer section of the electronic sensor device, and a closure mechanism configured to close the outer opening. The closure mechanism has a blind cover that is shaped to be inserted at least partially, with positive engagement, in the outer opening. The component further includes a connector configured to connect, non-detachably or detachably, the blind cover to the externally mounted component.

18 Claims, 4 Drawing Sheets

(56) References Cited

U.S. PATENT DOCUMENTS

2015/0274089 A1    10/2015    Schütz

FOREIGN PATENT DOCUMENTS

| DE | 202006014963 U1 | 2/2008 |
| DE | 102014012080 A1 | 3/2015 |
| DE | 102017205907 A1 | 10/2018 |

* cited by examiner

EXTERNALLY MOUNTED COMPONENT OF A MOTOR VEHICLE

CROSS-REFERENCE TO PRIOR APPLICATIONS

Priority is claimed to German Patent Application No. DE 10 2020 106 289.3, filed on Mar. 9, 2020, the entire disclosure of which is hereby incorporated by reference herein.

FIELD

The present disclosure relates to an externally mounted component of a motor vehicle, comprising a receiving space, which is designed to receive a camera device or an electronic sensor device, at least one outer opening, which is shaped in such a way that a lens means of the camera device or an outer section of the electronic sensor device can be inserted at least partially into the outer opening, and a closure means, which is configured to close the outer opening.

BACKGROUND

Motor vehicles can be equipped with one or more camera devices in order to improve visibility in a near field of the motor vehicle, particularly during maneuvering, and thereby improve safety and convenience. Such camera devices are normally installed in camera housings on different externally mounted components of the motor vehicle. Depending on the equipment version, there are often up to four camera devices on the motor vehicle. In this case, one camera device is provided in a rear area of the motor vehicle, and another camera device is arranged in a front area. Furthermore, a camera device can likewise be installed on an underside of each of the two exterior mirrors.

One possible externally mounted component on which a camera device is installed can be a grille in front paneling of the motor vehicle, for example. This grille has an outer opening, in which the camera device and its camera housing can be mounted. In a basic configuration of the motor vehicle, there are often no camera devices installed, and therefore another embodiment of the externally mounted component, in particular another version of the grille in the front paneling, must be held in stock in order to be able to implement both embodiments, with and without a camera device. If the externally mounted component, in particular the grille, is supposed to be designed in such a way that other electronic components, e.g. a radar device representing one example of an electronic sensor device, and/or a night vision camera, which forms an additional camera device, are to be accommodated, the number of grilles to be held in stock to enable all possible version configurations to be implemented is multiplied. This results, in particular, in higher production and stockholding costs for the externally mounted components to be held in stock.

US 2015/274089 A1 discloses a camera housing which has an outer opening that can be closed by means of a pivotable cover when the camera device accommodated within the camera housing is in an inactive state. This enables the camera device to be protected in an effective manner from external influences in its inactive state.

SUMMARY

In an embodiment, the invention provides an externally mounted component of a motor vehicle. The externally mounted component includes a receiving space configured to receive a camera device or an electronic sensor device, at least one outer opening shaped to enable insertion of a lens of the camera device or an outer section of the electronic sensor device, and a closure mechanism configured to close the outer opening. The closure mechanism has a blind cover shaped to be inserted at least partially, with positive engagement, in the outer opening. The component further includes a connector configured to connect, non-detachably or detachably, the blind cover to the externally mounted component.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
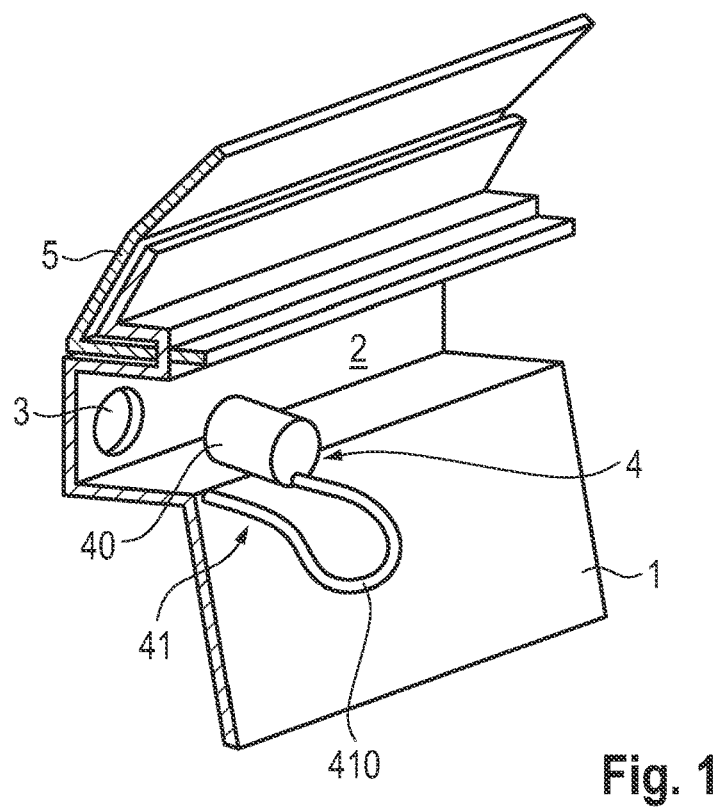
FIG. 1 shows a perspective sectional illustration of a part of an externally mounted component of a motor vehicle according to a first exemplary embodiment with an outer opening that can be closed by means of a blind cover.

In an embodiment, the present disclosure provides an externally mounted component of the type stated at the outset which can be used universally in a simple manner on different version configurations of the motor vehicle that are embodied with or without at least one camera device or electronic sensor device.

An externally mounted component according to the disclosure is distinguished by the fact that the closure means has a blind cover which is shaped in such a way that it can be inserted at least partially, with positive engagement, in the outer opening, and at least one connecting means, by means of which the blind cover is connected non-detachably or detachably to the externally mounted component. In all version configurations of the motor vehicle in which no camera device or sensor device is installed, the blind cover is inserted into the outer opening and fixed therein in a suitable manner, thus enabling the blind cover to close the outer opening in an effective manner. If a camera device or a sensor device is to be installed, the blind cover is not inserted into the relevant outer opening of the externally mounted component. It is thus possible, using just one embodiment of the externally mounted component, which may be a grille in front paneling for example, to implement different configurations of the motor vehicle either with or without a camera device or sensor device. It is thereby possible in an advantageous manner to reduce production and stockholding costs since just one embodiment of the externally mounted component has to be produced and stored. In particular, the configuration of the externally mounted component makes it possible to save tooling costs since it is not necessary to use different and correspondingly expensive production tools to produce different embodiments of the externally mounted component.

In a preferred embodiment, it is proposed that the blind cover and the connecting means are molded onto the externally mounted component. Since the blind cover and the connecting means are formed integrally with the externally mounted component, it is possible, in particular, to reduce the production and stockholding costs. Thus, for example, no additional tools are required for the production of the blind cover and the connecting means. These can be produced with the tool that is provided for the production of the externally mounted component.

In one advantageous embodiment, provision can be made for the connecting means to be designed as a retention strap. A retention strap of this kind is a simple means of enabling captive connection of the blind cover to the externally mounted component and simple handling during fitting of the blind cover in the outer opening of the externally mounted component.

In one alternative embodiment, there is the possibility that the connecting means is designed as a film hinge. This film hinge is likewise a simple means of enabling captive connection of the blind cover to the externally mounted component and simple handling during fitting of the blind cover in the outer opening of the externally mounted component.

In another alternative embodiment, provision can be made for the blind cover to be fastened detachably on the externally mounted component by means of a number of predetermined breaking points, which form connecting means. After the predetermined breaking points have been broken, the blind cover can be removed and inserted into the outer opening.

In one preferred embodiment, it is proposed that the blind cover is of self-latching design. It is thereby possible in a simple manner to achieve reliable retention of the blind cover in the outer opening of the externally mounted component, with the blind cover self-latching in its desired mounting position, in which it is inserted into the outer opening, on some other component, in particular on the externally mounted component. There is, for example, the possibility that the blind cover comprises a retaining collar extending in the circumferential direction, and that the receiving space is of substantially hollow-cylindrical design and comprises a wall that extends in the circumferential direction, wherein a latching recess extending in the circumferential direction, the shape of which corresponds to the shape of the retaining collar of the blind cover in such a way that the retaining collar can be connected by positive engagement to the latching recess, is formed on an inner side of the wall. It is thereby possible in a simple manner to provide self-latching connection of the blind cover to the wall of the receiving space.

In one alternative embodiment, there is also the possibility that the blind cover is of externally latched design. This means that the blind cover itself does not latch directly on some other component but that the externally mounted component has, for example, a holding device by means of which the blind cover can be fixed in the desired mounting position thereof on the externally mounted component. The holding device can preferably be designed in such a way that it can hold either the blind cover or the camera device or electronic sensor device and fix it on the externally mounted component. A holding device that can be used universally in this sense has the advantage that there is no need to provide two differently embodied holding devices to fix the blind cover or the camera device or electronic sensor device.

The holding device can be a separate component, for example. In order to reduce production and stockholding costs, there is a proposal in an advantageous embodiment that the holding device is formed integrally with the externally mounted component and, in particular, is molded onto the externally mounted component. In this way, the holding device can be produced during the production of the externally mounted component.

Referring to FIG. 1, a part of an externally mounted component 1 of a motor vehicle that is embodied in accordance with a first exemplary embodiment is shown there. In the present case, the externally mounted component 1 is a grille, which is connected to paneling 5, in particular front paneling, of the motor vehicle. The externally mounted component 1 has a receiving space 2, which is designed to receive a camera device (not illustrated explicitly here). Furthermore, the externally mounted component 1 comprises at least one outer opening 3, which is shaped in such a way that a lens means of the camera device can be inserted at least partially in a snug manner into the outer opening 3 during the mounting process. The term "lens means" should be interpreted to mean an arrangement of one or more optical lenses, wherein it is also possible for other optically functional components to be parts of the lens means. The lens means can form a camera objective lens of the camera device, for example.

In order to allow equipment versions of the motor vehicle without the camera device and to avoid having to hold in stock for this purpose externally mounted components 1 without the outer opening 3, a closure means 4 that can be inserted selectively into the outer opening 3 is provided. It is thereby possible to close the outer opening 3 of the externally mounted component 1 when no camera device is to be installed.

The closure means 4 has a blind cover 40, which is shaped in such a way that it can be inserted at least partially, with positive engagement, into the outer opening 3 from the inside during mounting, and can close this opening. Furthermore, the closure means 4 has at least one connecting means 41, by means of which the blind cover 40 is connected to the externally mounted component 1. The blind cover 40 and the connecting means 41 are preferably molded directly onto the externally mounted component 1 and are thus formed integrally with the externally mounted component 1. It is thereby advantageously possible to reduce production costs and stockholding costs. The externally mounted component 1 with the blind cover 40 and the connecting means 41 can thus advantageously be produced by means of a single tool. In the case of the exemplary embodiment illustrated in FIG. 1, the connecting means 41 is designed as a retention strap 410.

Figure 2:
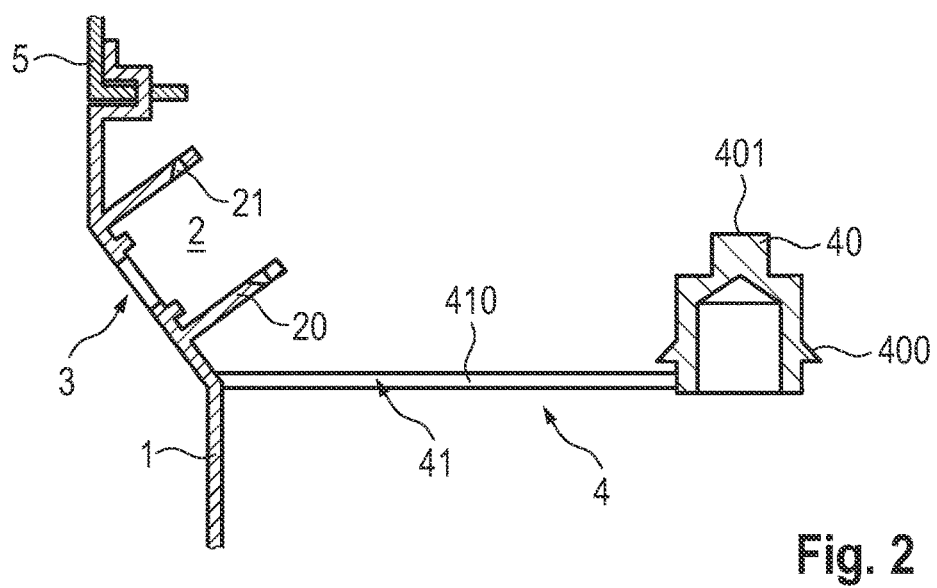
FIG. 2 shows a section through the externally mounted component shown in FIG. 1 in a molding position with details of a first fastening variant of the blind cover.
Figure 3:
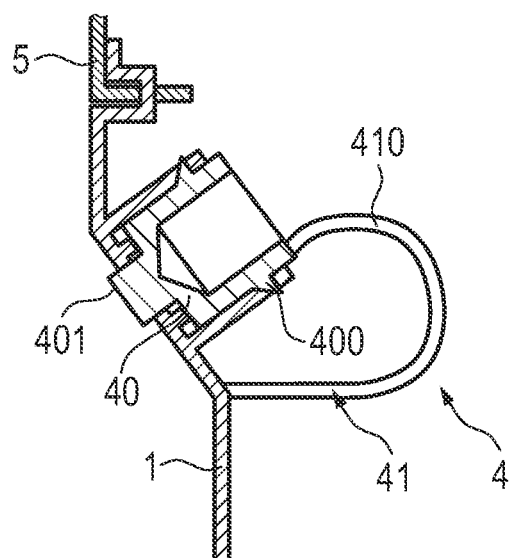
FIG. 3 shows a section through the externally mounted component after the mounting of the blind cover in the outer opening in accordance with the first fastening variant.

Referring to FIGS. 2 and 3, further details of a first fastening variant of the blind cover 40 will be explained below in order to obtain firm seating of the blind cover 40 on the externally mounted component 1 after mounting. In the present case, the blind cover 40 is of self-latching design and has a retaining collar 400 extending in the circumferential direction. The receiving space 2 is substantially in the form of a hollow cylinder, at least partially, and has a wall 20 that extends in the circumferential direction. A latching recess 21 is formed on an inner side of the wall 20, said recess extending along the wall 20 in the circumferential direction and its shape corresponding in such a way to the shape of the retaining collar 400 of the blind cover 40 that the retaining collar 400 can engage positively in the latching recess 21 in the manner of a clip joint during mounting. It thus becomes clear that the blind cover 40 latches automatically with the wall 20 of the receiving space 2 as it is inserted into the outer opening 3 and extends by means of a front end 401 into the outer opening 3 of the externally mounted component 1. This situation is illustrated in FIG. 3.

If a camera device is to be mounted within the receiving space 2, an additional camera holder is required since the camera housing of the camera device does not have a retaining collar like the blind cover 40. This means that the camera housing of the camera device must be clamped in the desired mounting position by the separate camera holder.

Figure 4:
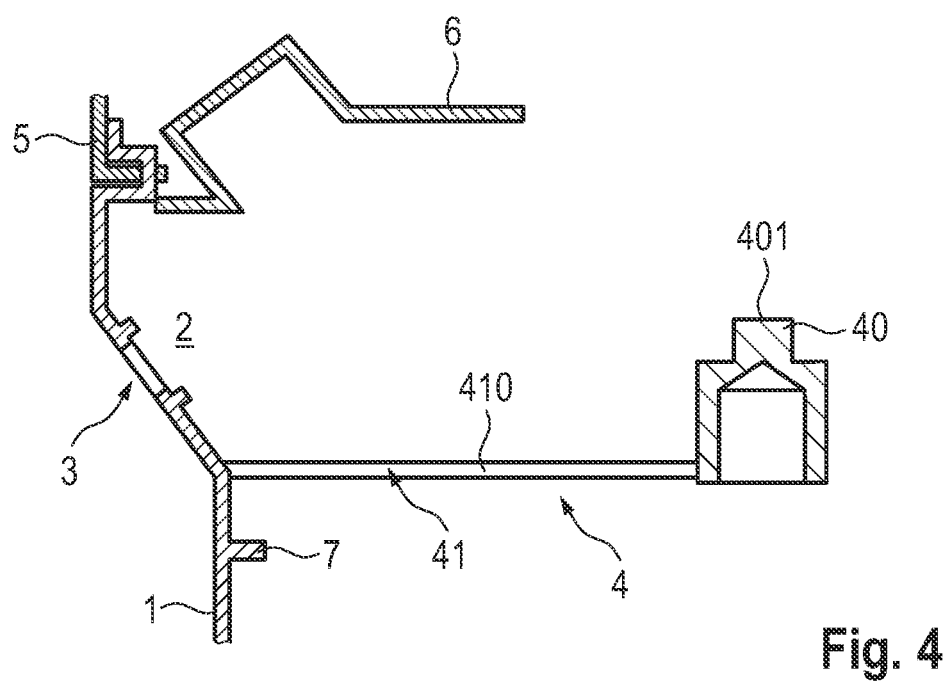
FIG. 4 shows a section through the externally mounted component shown in FIG. 1 in a molding position with details of a second fastening variant of the blind cover.
Figure 5:
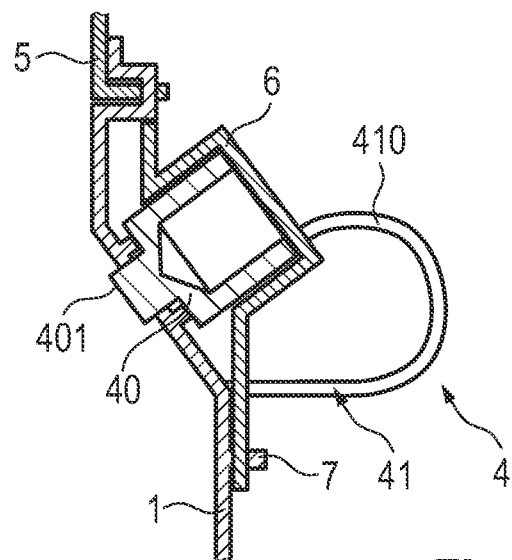
FIG. 5 shows a section through the externally mounted component after the mounting of the blind cover in the outer opening in accordance with the second fastening variant.

Referring to FIGS. 4 and 5, a second fastening variant of the blind cover 40 will be explained in greater detail below. In contrast to the exemplary embodiment shown in FIGS. 2 and 3, the blind cover 40 is not self-latching but is of externally latched design. For this purpose, a holding device 6 is provided, by means of which the blind cover 40 can be fixed in its desired mounting position, which is shown in FIG. 5, in a clamping manner on the externally mounted component 1. The blind cover 40 is inserted partially into the outer opening 3—in a manner similar to a camera device. The holding device 6 is then pivoted out of the position shown in FIG. 4 into the position shown in FIG. 5, in which it fits over the blind cover 40 and is secured on a holding means 7, which is formed on an inner side of the externally mounted component 1. The pivotability of the holding device 6 can be achieved by means of a film hinge, for example. The holding device 6 can be a separate component or can be molded onto the externally mounted component 1, thus being formed integrally with the externally mounted component 1. Lower production and stockholding costs are once again the result. The holding device 6 can preferably be designed in such a way that it can hold either the blind cover 40 or the camera device and fix it on the externally mounted component 1. A holding device 6 that can be used universally in this sense has the advantage that there is no need to provide two differently embodied holding devices to fix the blind cover 40 or the camera device.

Figure 6:
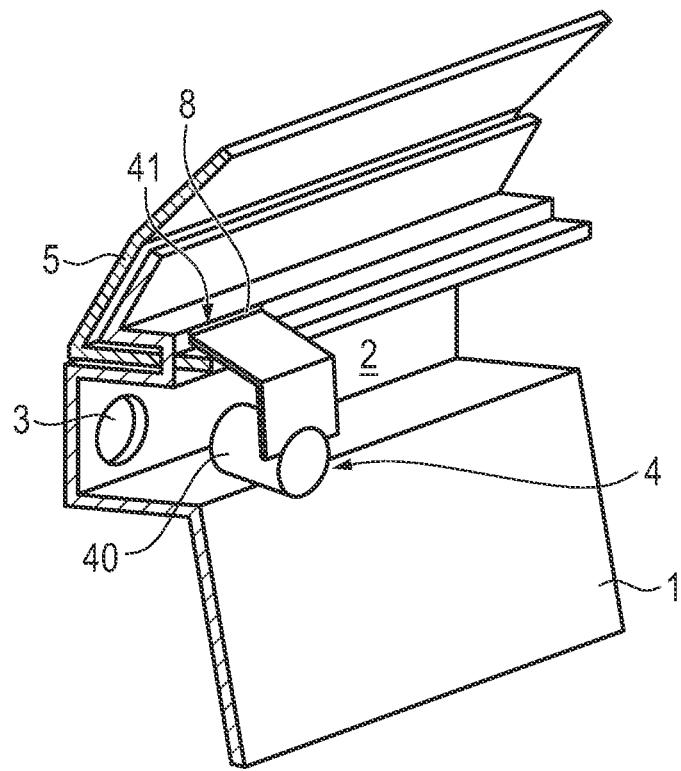
FIG. 6 shows a perspective sectional illustration of a part of an externally mounted component of a motor vehicle according to a second exemplary embodiment with an outer opening that can be closed by means of a blind cover.

Referring to FIG. 6, another exemplary embodiment of an externally mounted component 1 will be explained in greater detail below. This differs from the exemplary embodiment explained above only in that the blind cover 40 is articulated on the externally mounted component 1 by means of a film hinge 8 in order thereby to obtain the pivotability of the blind cover 40. As in the exemplary embodiment described above, the blind cover 40 can be of self-latching or externally latched design, in particular externally latched by means of the holding device 6.

Figure 7:
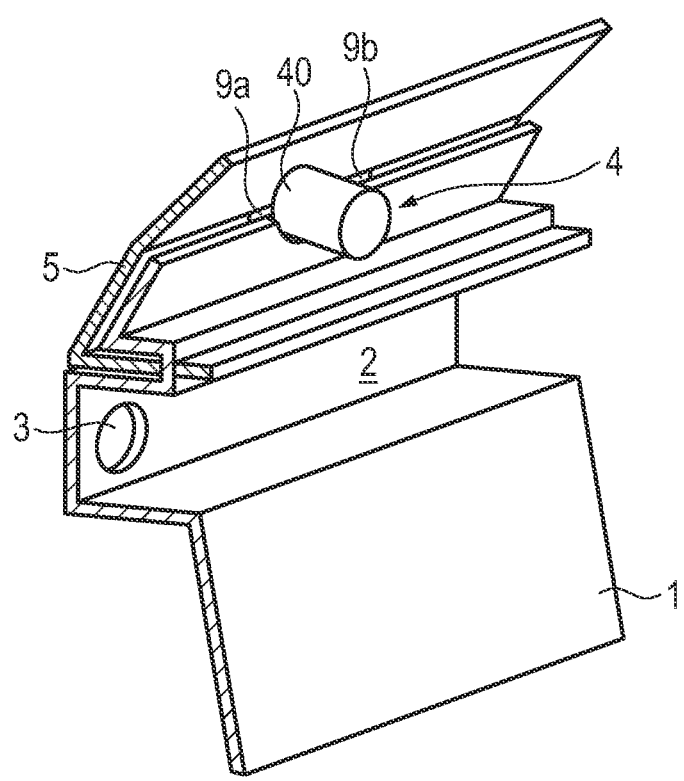
FIG. 7 shows a perspective sectional illustration of a part of an externally mounted component of a motor vehicle according to a third exemplary embodiment with an outer opening that can be closed by means of a blind cover.

Another exemplary embodiment of an externally mounted component 1 is shown in FIG. 7. Here, the blind cover 40 is not articulated on the externally mounted component 1 but is connected to the inner side of the externally mounted component 1 by means of a number of predetermined breaking points 9a, 9b. After the predetermined breaking points 9a, 9b of the blind cover 40 have been broken, the blind cover 40 can be inserted at least partially into the outer opening 3 of the externally mounted component 1 and fixed therein. In this case, the blind cover 40 can once again be of self-latching or externally latched design, in particular externally latched by means of the holding device 6, in the manner described above.

The externally mounted components 1 described here are a simple means of enabling the outer opening 3 of the externally mounted component 1 to be closed in a particularly simple manner on equipment versions of the motor vehicle without a camera device, since this opening is not needed. On equipment versions of the motor vehicle with a camera device, the blind cover 40 has no use. There is thus advantageously no need to produce and stock two different versions of the externally mounted component 1, with and without an outer opening 3, in order to be able to produce equipment versions of the motor vehicle with or without a camera device.

The concepts explained above can also be transferred to externally mounted components 1 which have additional outer openings, in particular openings for receiving a lens means of a further camera device or an outer section of a sensor means. This further camera device can be a night vision camera, for example.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An externally mounted component of a motor vehicle, comprising:
 a receiving space configured to receive a camera device or an electronic sensor device,
 at least one outer opening shaped to enable insertion of a lens of the camera device or an outer section of the electronic sensor device, and
 a closure mechanism configured to close the outer opening, the closure mechanism having a blind cover shaped to be inserted at least partially, with positive engagement, in the outer opening, and a connector configured to connect, non-detachably or detachably, the blind cover to the externally mounted component, wherein the connector is designed as a retention strap.

2. The externally mounted component as claimed in claim 1, wherein the blind cover and the connector are molded onto the externally mounted component.

3. The externally mounted component as claimed in claim 1, wherein the blind cover is of self-latching design.

4. The externally mounted component as claimed in claim 3, wherein the blind cover comprises a retaining collar extending in a circumferential direction, and wherein the receiving space is of substantially hollow-cylindrical design and comprises a wall that extends in the circumferential direction, wherein a latching recess extending in the circumferential direction, the shape of which corresponds to the shape of the retaining collar of the blind cover in such a way that the retaining collar can be connected by positive engagement to the latching recess, is formed on an inner side of the wall.

5. The externally mounted component as claimed in claim 1, wherein the blind cover is of externally latched design.

6. The externally mounted component as claimed in claim 4, wherein the externally mounted component has a holding device by which the blind cover is configured to be fixed in the desired mounting position thereof on the externally mounted component.

7. The externally mounted component as claimed in claim 6, wherein the holding device is formed integrally with the externally mounted component.

8. An externally mounted component of a motor vehicle, comprising:

a receiving space configured to receive a camera device or an electronic sensor device, at least one outer opening shaped to enable insertion of a lens of the camera device or an outer section of the electronic sensor device, and a closure mechanism configured to close the outer opening, the closure mechanism having a blind cover shaped to be inserted at least partially, with positive engagement, in the outer opening, and a connector configured to connect, non-detachably or detachably, the blind cover to the externally mounted component, wherein the blind cover is fastened detachably on the externally mounted component by a number of predetermined breaking points that form the connector.

9. The externally mounted component as claimed in claim 8, wherein the blind cover is of self-latching design.

10. The externally mounted component as claimed in claim 9, wherein the blind cover comprises a retaining collar extending in a circumferential direction, and wherein the receiving space is of substantially hollow-cylindrical design and comprises a wall that extends in the circumferential direction, wherein a latching recess extending in the circumferential direction, the shape of which corresponds to the shape of the retaining collar of the blind cover in such a way that the retaining collar can be connected by positive engagement to the latching recess, is formed on an inner side of the wall.

11. The externally mounted component as claimed in claim 8, wherein the blind cover is of externally latched design.

12. The externally mounted component as claimed in claim 10, wherein the externally mounted component has a holding device by which the blind cover is configured to be fixed in the desired mounting position thereof on the externally mounted component.

13. An externally mounted component of a motor vehicle, comprising:

a receiving space configured to receive a camera device or an electronic sensor device, at least one outer opening shaped to enable insertion of a lens of the camera device or an outer section of the electronic sensor device, and a closure mechanism configured to close the outer opening, the closure mechanism having a blind cover shaped to be inserted at least partially, with positive engagement, in the outer opening, and a connector configured to connect, non-detachably or detachably, the blind cover to the externally mounted component wherein the blind cover is of self-latching design, and wherein the blind cover comprises a retaining collar extending in a circumferential direction, and wherein the receiving space is of substantially hollow-cylindrical design and comprises a wall that extends in the circumferential direction, wherein a latching recess extending in the circumferential direction, the shape of which corresponds to the shape of the retaining collar of the blind cover in such a way that the retaining collar can be connected by positive engagement to the latching recess, is formed on an inner side of the wall.

14. The externally mounted component as claimed in claim 13, wherein the blind cover and the connector are molded onto the externally mounted component.

15. The externally mounted component as claimed in claim 13, wherein the connector is designed as a retention strap.

16. The externally mounted component as claimed in claim 13, wherein the connector is designed as a film hinge.

17. The externally mounted component as claimed in claim 13, wherein the externally mounted component has a holding device by which the blind cover is configured to be fixed in the desired mounting position thereof on the externally mounted component.

18. The externally mounted component as claimed in claim 17, wherein the holding device is formed integrally with the externally mounted component.

* * * * *